(12) United States Patent
Husain et al.

(10) Patent No.: US 6,702,944 B2
(45) Date of Patent: Mar. 9, 2004

(54) MULTI-STAGE FILTRATION AND SOFTENING MODULE AND REDUCED SCALING OPERATION

(75) Inventors: Hidayat Husain, Brampton (CA); Henry Behmann, Puslinch (CA); Pierre Côté, Dundas (CA); Ian Pottinger, Ancaster (CA); Ella Murphy, Hamilton (CA)

(73) Assignee: Zenon Environmental Inc., Oakville (CA)

(*) Notice: Subject to any disclaimer, the term of this patent is extended or adjusted under 35 U.S.C. 154(b) by 0 days.

(21) Appl. No.: 09/893,638

(22) Filed: Jun. 29, 2001

(65) Prior Publication Data

US 2002/0108906 A1 Aug. 15, 2002

Related U.S. Application Data

(60) Provisional application No. 60/216,668, filed on Jul. 7, 2000.

(30) Foreign Application Priority Data

Jul. 7, 2000 (CA) .................................... 2313740

(51) Int. Cl.[7] .......................... B01D 65/02; B01D 65/06
(52) U.S. Cl. ...................................... 210/636; 210/652
(58) Field of Search .............................. 210/636, 652, 210/106, 190, 321.69

(56) References Cited

U.S. PATENT DOCUMENTS

| | | | |
|---|---|---|---|
| 4,357,254 A | 11/1982 | Kapiloff et al. |
| 4,451,369 A | 5/1984 | Sekino et al. |
| 4,812,270 A | 3/1989 | Cadotte et al. |
| 4,902,417 A | 2/1990 | Lien |
| 5,013,437 A | 5/1991 | Trimmer et al. |
| 5,045,197 A | 9/1991 | Burrows |
| 5,069,793 A | 12/1991 | Kaschemekat et al. |
| 5,152,901 A | 10/1992 | Hodgdon |
| 5,207,916 A | 5/1993 | Goheen et al. |
| 5,250,118 A | 10/1993 | Netwig et al. |
| 5,288,308 A | 2/1994 | Puri et al. |
| 5,310,486 A | 5/1994 | Green et al. |
| 5,358,640 A | 10/1994 | Zeiher et al. |
| 5,658,460 A | 8/1997 | Cadotte et al. |
| 5,766,479 A | * | 6/1998 | Collentro et al. |
| 5,895,570 A | 4/1999 | Liang |
| 6,059,974 A | 5/2000 | Scheurman, III |
| 6,113,797 A | 9/2000 | Al-Samadi |

FOREIGN PATENT DOCUMENTS

EP 0812805 A2 12/1997

OTHER PUBLICATIONS

English Language Abstract of Japanese Patent Publication No. JP57190605, published Nov. 24, 1982.
English Language Abstract of Japanese Patent Publication No. JP63171605, published Jul. 15, 1988.
Derwent Publications Ltd., XP–002181300 Oct. 1978.

* cited by examiner

Primary Examiner—Terry K. Cecil
(74) Attorney, Agent, or Firm—Bereskin & Parr

(57) ABSTRACT

A filtration module has at least one nanofiltration or reverse osmosis membrane. The module is used to filter water and, when optionally fitted with at least one membrane adapted to selectively reject hardness causing salts, is used to remove hardness. Methods of cleaning using acidic solutions or gaseous carbon dioxide are discussed. Cleaning methods include the steps of periodically stopping permeation, injecting an acidic solution or gaseous carbon dioxide into the feed/retentate side of the module, holding the acidic solution or gaseous carbon dioxide in the module for a selected time, and flushing the acidic solution or gaseous carbon dioxide from the feed/retentate side of the module after expiration of the selected time.

9 Claims, 11 Drawing Sheets

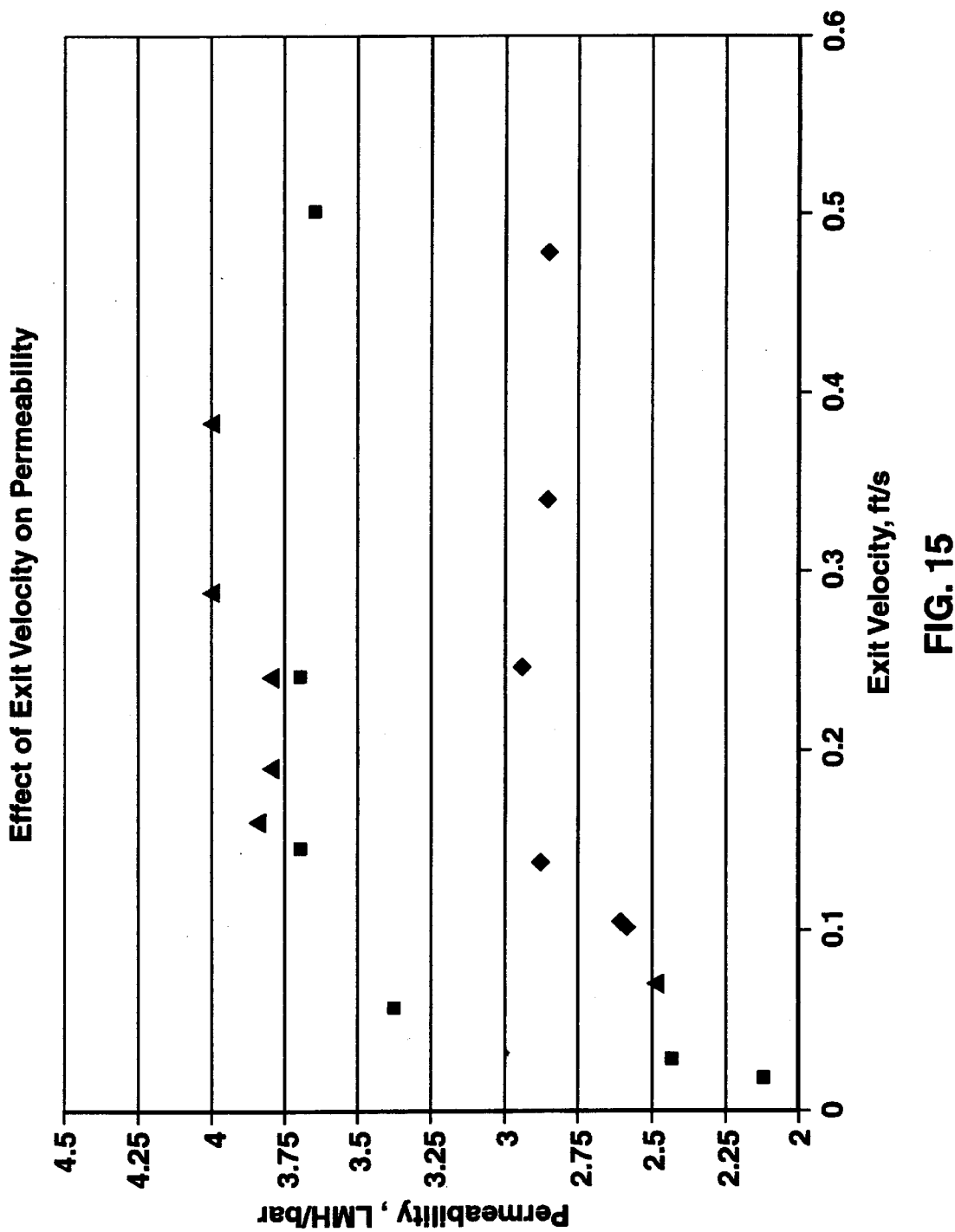

MULTI-STAGE FILTRATION AND SOFTENING MODULE AND REDUCED SCALING OPERATION

This application claims the benefit of U.S. Provisional Application No. 60/216,668, filed Jul. 7, 2000.

FIELD OF THE INVENTION

This invention relates to a multi-stage nanofiltration or reverse osmosis membrane module, to processes for using such a module to filter water or to remove hardness, to processes for cleaning or maintaining the permeability of such a module, and to a small-scale system particularly for use in private homes and small commercial buildings.

BACKGROUND OF THE INVENTION

Hollow fibre semi-permeable membranes are useful for filtering solids rich fluids. Membranes in the nanofiltration and reverse osmosis ranges may also be useful for separating salts. For example, U.S. Pat. No. 5,152,901 describes a nanofiltration membrane material capable of filtering out suspended solids and large organic molecules and generally rejecting calcium salts while generally permeating sodium salts. U.S. Pat. Nos. 4,812,270 and 5,658,460 also describe membranes useful for rejecting salts. Membranes with similar characteristics, such as Stork Friesland's NR 015-500, are available on the market.

Membranes as described above may be used in the form of hollow fibres operated in an inside-out flow mode. The hollow fibres are suspended between a pair of opposed tube sheets or headers. The headers maintain a separation between the lumens of the membranes and their outer surfaces. Thus, pressurized feed water can be supplied to the lumens of one end of the membranes, permeate can be collected as it leaves the outer surface of the membranes, and a concentrate or retentate can be extracted from the lumens at the other end of the membranes.

Various characteristics of hollow fibre membranes, however, make them difficult to use in such an inside-out flow mode. For example, the inner diameter of the hollow fibre is small which results in significant pressure and flux reductions towards the outlet end of long hollow fibres. The problem is most significant when the feed pressure is low.

U.S. Pat. No. 5,013,437 describes one method of attempting to reduce the problem of pressure and flux loss in long fibres. In an embodiment of that patent, an inside-out hollow fibre filtration module is split into two stages. The retentate from the first stage becomes the feed for the second stage. The ratio of the surface areas of the first to the second stages is preferably about 1.5:1 to 2.25:1. This helps to increase the pressure and velocity of the retentate from the first stage as it becomes the feed to the second stage such that both stages have more nearly equal pressure drops. The stages are arranged concentrically, however, and permeate, particularly from the second stage, must flow along the outside of the fibres to reach an outlet port. With a reasonable packing density of hollow fibre membranes, the head loss in the permeate flow would be substantial if used to filter liquids. Thus the transmembrane pressure differential across the membranes of the second stage is reduced. It is also difficult to pot fibres in an annular ring as required in the '437 module.

A similar principle has also been used in large scale systems using spiral wound membranes. A large number of membrane modules are arranged in stages. Each successive stage has fewer modules than the preceding stage and the retentate from preceding stages becomes the feed of the succeeding stages. Such a system is both large and complex and not suited to residential or small commercial systems.

Makers of small scale nanofiltration or reverse osmosis membrane filtration systems typically try to address the problems discussed above by using a single stage filtration module, and recirculating the retentate to the feed inlet to increase the velocity of the feed water and the transmembrane pressure. In such systems, the minimum velocity of the feed/retentate is between about 3–10 ft/s. This technique requires a high rejection membrane, and is operated at a very low per pass recovery. This leads to rapid fouling and either frequent cleaning or replacement of the membranes. Energy costs and pressure required are also high.

Another characteristic of semi-permeable membranes is that their pores become fouled over time particularly including, in the case of membranes used for water softening, because of carbonate scaling. In large scale systems, carbonate scaling may be addressed by partially softening the feed water using resin exchange beds or by adding an anti-scalant to the feed water. Such techniques are generally too complex to be practicable in small scale systems, particularly in private homes.

SUMMARY OF THE INVENTION

It is an object of the invention to improve on the prior art. It is another object of the invention to provide a membrane filtration module, particularly one that is useful for small scale filtration or water softening. It is another object of the invention to provide a process to clean or reduce scaling of a membrane module, particularly one used for water softening. It is another object of the invention to provide a small scale filtration or water softening system. These objects are met by the combination of features, steps or both found in the claims. The following summary may not describe all necessary features of the invention which may reside in a sub-combination of the following features or in a combination with features described in other parts of this document.

In various aspects, the invention provides a filtration module having a plurality of hollow fibre nanofiltration or reverse osmosis membranes suspended between a pair of opposed headers. The outer surfaces of the membranes are sealed to the headers while their lumens are open at the distal faces of the headers.

Within the module, the hollow fibre membranes are grouped into a plurality of preceding or succeeding stages (some stages being both preceding and succeeding). The lumens of the hollow fibre membranes are open at first and second ends of the stages. Flow between stages occurs across the distal faces of the headers. A module feed inlet is connected in fluid communication with the first end of a first stage. The remaining stages are connected in series behind the first stage with fluid connections between the second end of each preceding stages and the first end of each directly succeeding stage. A module outlet is connected in fluid communication with the second end of a last stage. A permeate collection plenum surrounds the stages and is in fluid communication with each stage. The surface area of the membranes of each preceding stage is between 1 and 2.5 times the surface area of the membranes of a directly succeeding stage and the surface area of the stages decreases from the first stage to the last stage.

To construct the connections between the stages, a first cap covers the distal face of one header and a second cap covers the distal face of the other header. The permeate plenum includes the space between the proximal faces of the headers and an outer shell. Dividers within one or both of the caps collect groups of the membranes into the stages while leaving open fluid connections between the second end of each preceding stage and the first end of each directly succeeding stage. The module inlet and module retentate outlet, typically provided in the caps, are in fluid communication with the first end of the first stage and the second end of the last stage respectively. Thus feed water enters the first end of the first stage and the portion not permeated exits the second end of the first stage. From there, the second end cap directs the feed/retentate to the first end of the second stage. The water not permeated in the second stage arrives at the first cap. In a two stage device, the water not permeated then leaves the module. In a module with more stages, the first cap redirects the feed/retentate to the first end of another stage and the water not permeated flows to the second cap and so on until the second end of the last stage is reached.

The stages are arranged so that each is adjacent the perimeter of the module and interstage flows are generally parallel to the periphery of the module. For example, the stages may be configured as sectors of a cylinder. In smaller modules, typically about 3" in diameter or less, the membranes may be separated into stages by a spider in each header. In larger modules, groups of membranes may be potted individually or simultaneously into opposed pairs of collars which may be sector shaped. Once potted into the pairs of collars, the membranes may be coated. The pairs of collars are then glued together to form a pair of headers, which are cylindrical when the collars are sector shaped. The pairs of collars are easier to work with than large cylindrical headers and, in particular, facilitate drying during membrane coating procedures. Dividers to separate stages may be made to correspond with the edges of the collars or with separators inserted into the collars.

In an embodiment, the dividers between stages are fitted with valves and arranged such that when feed water flows into the module in a reverse direction, entering through the module retentate outlet, the dividers re-collect the groups of membranes into second preceding and second succeeding stages having first and second ends. The dividers leave open fluid connections generally parallel to the periphery of the module between the second end of each second preceding stage and the first end of each second succeeding stage. In the re-collection of the membranes, the surface area of the membranes of each second preceding stage is between 1 and 2.5 times the surface area of the membranes of a second directly succeeding stage and the surface area of the stages decreases from the first stage to the last stage. This is achieved by using one way valves opening in a direction such that the grouping and re-grouping of membranes is performed by the action of liquid flowing through the module, ie. opening valves where the pressure differential is in the direction that the valve opens and closing valves where the pressure differential is opposite the direction that the valves open.

Modules as described above are used to filter water and can be used to remove hardness when optionally fitted with hollow fibre membranes adapted to selectively reject hardness causing salts. Water to be filtered flows through the stages in series while a filtered and optionally softened permeate is collected from the outer surfaces of the membranes. The membranes may have a permeability of about 0.1 gfd/psi or more and total rejection of 80% or more. The minimum velocity of flow/retentate through the lumens of the membranes may be between 0.15 ft/s and 0.6 ft/s.

In various other aspects, the invention provides a reverse osmosis or nanofiltration apparatus including a membrane module. The filtration module may have a plurality of preceding or succeeding stages of hollow fibre membranes suspended between opposed headers, as described above. The module has a module feed inlet, a module retentate outlet and a permeate outlet. A feed water passageway fluidly connects the module feed inlet to a source of pressurized water such as a well pump or a municipal water supply, optionally increased in pressure with a supplemental pump. The permeate outlet is preferably connected to a permeate tank such as a diaphragm tank or air cushion tank in which pressure is related to the volume of water in the tank. When a selected pressure in the permeate tank is reached, any feed side pumps are shut off and the module retentate outlet is closed. Preferably, the membranes have a minimum permeability of 0.1 gfd/psi, minimum rejection of 80% and a minimum hardness rejection of 70%. The minimum flow velocity of feed/retentate is preferably between 0.15 and 0.6 ft/s, and more preferably between 0.2 ft/s and 0.3 ft/s. The feed/retentate passes through the module without being recirculated, preferably with an overall module pressure drop between 30 psi and 120 psi.

In other aspects of the invention, processes for cleaning and reducing scale formation on membrane surfaces are described. Particularly when the module is used to provide a softened permeate, carbonate scale may form in the membranes. To control scaling, suitable cleaning chemicals, such as acids or chemicals that produce acids in water, for example carbon dioxide or citric acid, are injected into the feed/retentate side of the module, either dissolved into a liquid such as feed water or, in the case of carbon dioxide, as a gas. A controllable cleaning chemical addition system is operable to inject a fluid comprising cleaning chemical into the pressurized feed water or the feed/retentate side of the module.

In a continuous while permeating method, the cleaning chemical is injected substantially continuously into to the feed water while the apparatus is producing permeate. Where the cleaning chemical is carbon dioxide, the carbon dioxide is preferably injected in amounts such that the Langelier Scaling Index of the feed water is zero or slightly negative. Optionally, carbon dioxide may be injected only into later stages of the module. In a discontinuous while permeating method the cleaning chemical, such as carbon dioxide, is injected into the feed water periodically while the apparatus is producing permeate. In another method, the direction of flow through the module is reversed while the cleaning chemical, such as carbon dioxide, is being added to apply cleaning chemical to the module from what is at other times the retentate outlet.

In a continuous without permeation method, the cleaning chemical, such as carbon dioxide, is injected substantially continuously to the feed water while the apparatus is not producing permeate. A retentate outlet is more fully opened to allow the feed/retentate to flush through the lumen side of the module to a drain. In a hold and flush method, permeate production is also temporarily stopped and the retentate outlet is more fully opened. A fluid containing cleaning chemical, such as carbon dioxide, flows into the module inlet, accomplished for example by injecting compressed carbon dioxide gas into a flow of feed water flushing through the lumen side of the module inlet. The fluid containing cleaning chemical displaces the feed/retentate in the lumens of the membranes until a substantial part, and preferably all, of the volume of the lumens of the hollow fibre membranes contains the cleaning chemical. The flow of the fluid containing cleaning chemical is stopped and the cleaning chemical is permitted to react with foulants for a selected hold time. Optionally, the module may then be flushed with feed. The selected hold time is typically between 1 and 30 minutes or between about 10 minutes and 20 minutes. The flush and hold method is performed periodically, for example once a day during a time when demand for permeate is low.

In a gaseous cleaning method, carbon dioxide gas enters the feed/retentate side of the module and displaces the feed/retentate. The gas is held in the module under pressure for a period of time and then flushed out with feed water. For additional cleaning, the process may be repeated.

All references to gallons in this applications refer to US gallons.

BRIEF DESCRIPTION OF DRAWINGS

Embodiments of the invention will be described below with reference to the following figures.

FIG. 15 is a graph which shows the effect of minimum feed/retentate velocity on the permeability of the membrane module.

DESCRIPTION OF EMBODIMENTS

Module Design

Figure 2:
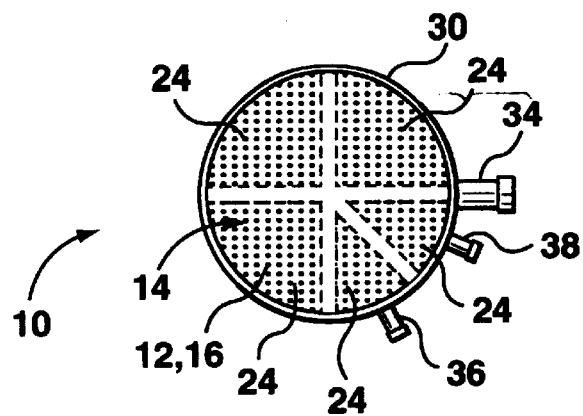
FIG. 2 shows a plan view of the module of FIG. 1 with top cap removed.
Figure 1:
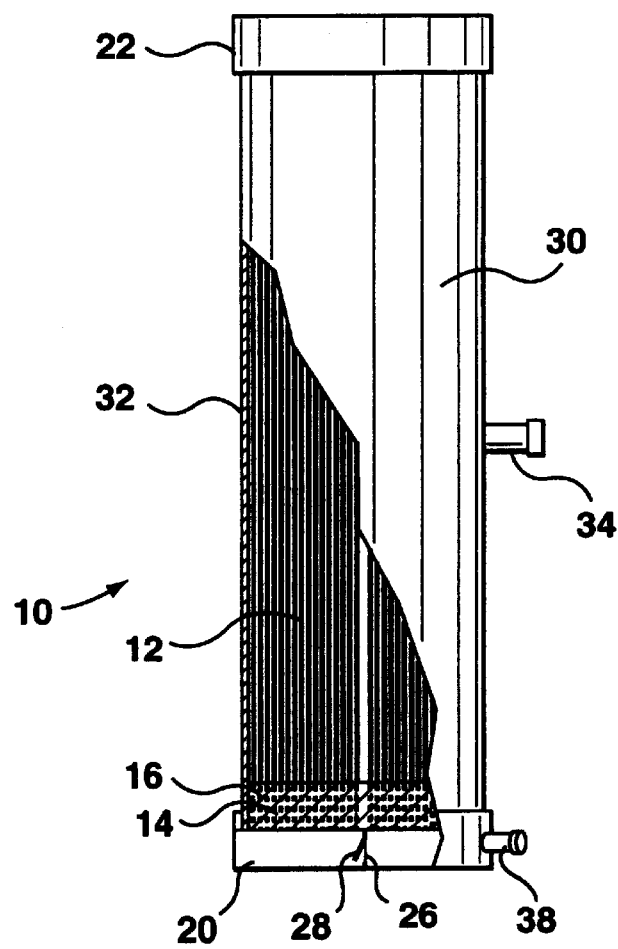
FIG. 1 shows a partially cut away elevation of a filtration module which may be used as a four stage module.

FIGS. 1 and 2 show the general arrangement of a multi-stage filtration module 10. The module 10 has a plurality of filtering hollow fibre membranes 12 suspended between opposed headers 14. The membranes are in the reverse osmosis or nanofiltration, preferably in the nanofiltration range, and more preferably able to selectively retain hardness causing salts and permeate softened water. The ends 16 of the membranes 12 are potted in a closely spaced relationship in the headers 14 such that their outer surfaces are sealed to the headers 14 and the lumens of the membranes 12 are open at the distal faces of the headers 14. A first cap 20 and a second cap 22 cover the distal faces of the headers 14 and are sealed to the headers 14. The membranes 12 are arranged into groups 24 and each group may be separated by an area of the headers 14 having no membranes 12 potted in it. The membranes 12 may be maintained in groups 24 during potting by wrapping ends of groups in an expandable plastic mesh. Dividers 26 within one or both of the caps 20, 22 (and optionally formed as part of the caps 20, 22) extend from the distal surface of the caps 20, 22 to sealingly contact some or all of the areas of the headers 14 having no membranes 12. Optionally, the dividers 26 may be inserted into the headers 14 during potting in which case the dividers 26 help separate groups 14 of membranes 12 and are later bonded to the headers 14. Some or all of the dividers 26 may have openings which may include one or more one way valves 28, such as flap valves, located within them. The arrangement and potting of membranes in distinct or physically separated groups 24 is not strictly necessary, but it allows the dividers 26 to better isolate groups 24 and minimize or eliminate membranes 12 crossing over between groups 24.

The perimeter of the module 10 is surrounded by a casing 30. The volume inside of the casing 30 between the proximal faces of the headers 14 and not occupied by membranes 12 forms a permeate plenum 32. The permeate plenum 32 includes the space around the membranes 12 and may also include an open space adjacent the periphery of the module 10 in direct fluid communication with each of the groups of membranes 12. A permeate outlet 34 in fluid communication with the permeate plenum 32 allows permeate to be removed from the module 10. Thus water permeated through the membranes 12 in a group 24 can flow directly to the permeate outlet 34 through the path of least resistance and is not required to flow through the groups 24 in a selected path. This can be achieved by arranging the groups of membranes 12 as sectors of a cylinder as shown. Other configurations are also possible. For example, in a square or rectangular module groups of membranes 12 of various sizes can be located on either side of a centre line of the module. A module feed inlet 36 admits feed water into one of the caps 20, 22. Retentate leaving the module 10 flows out of a module feed outlet 38 also located in one of the caps 20, 22.

Figure 3:
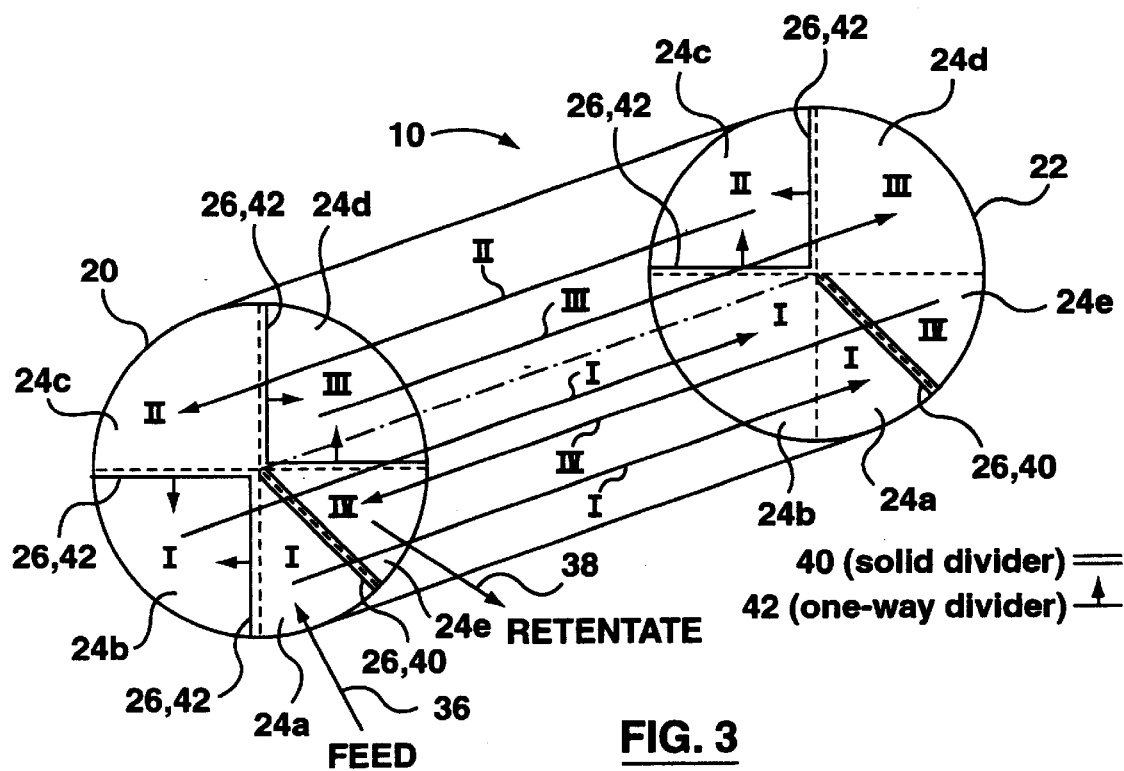
FIGS. 3 and 4 show the forward and reverse flow respectively through a four stage module.
Figure 4:
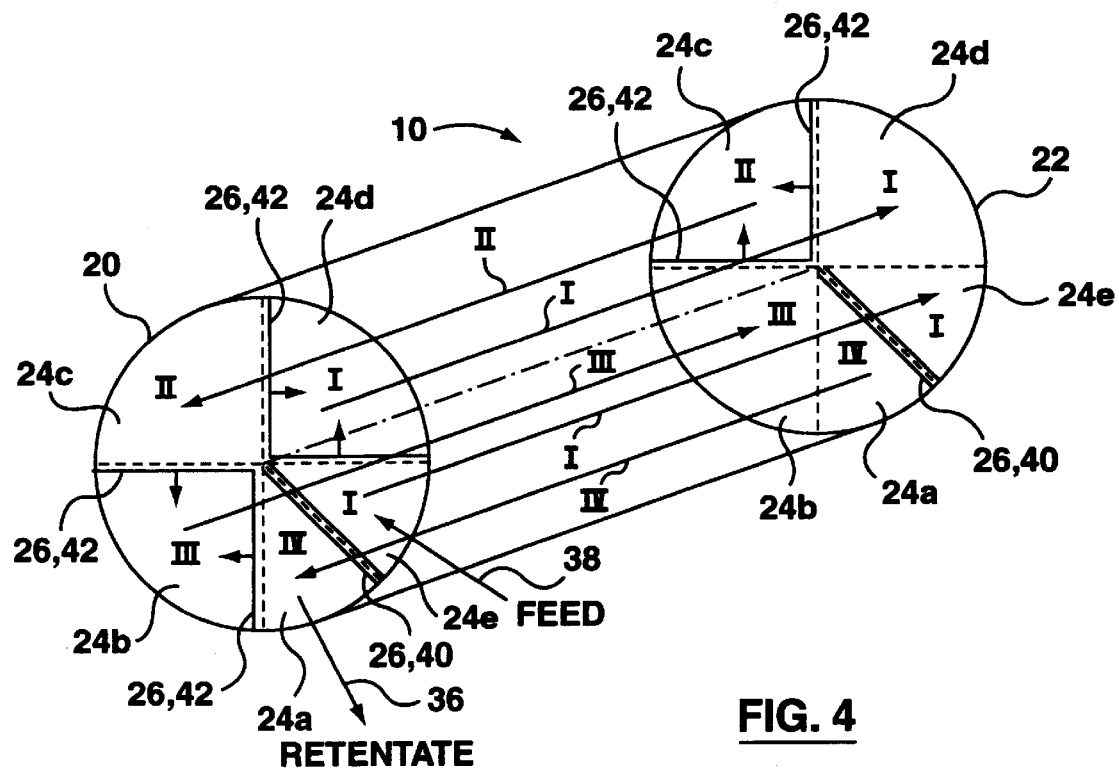
Figure 5:
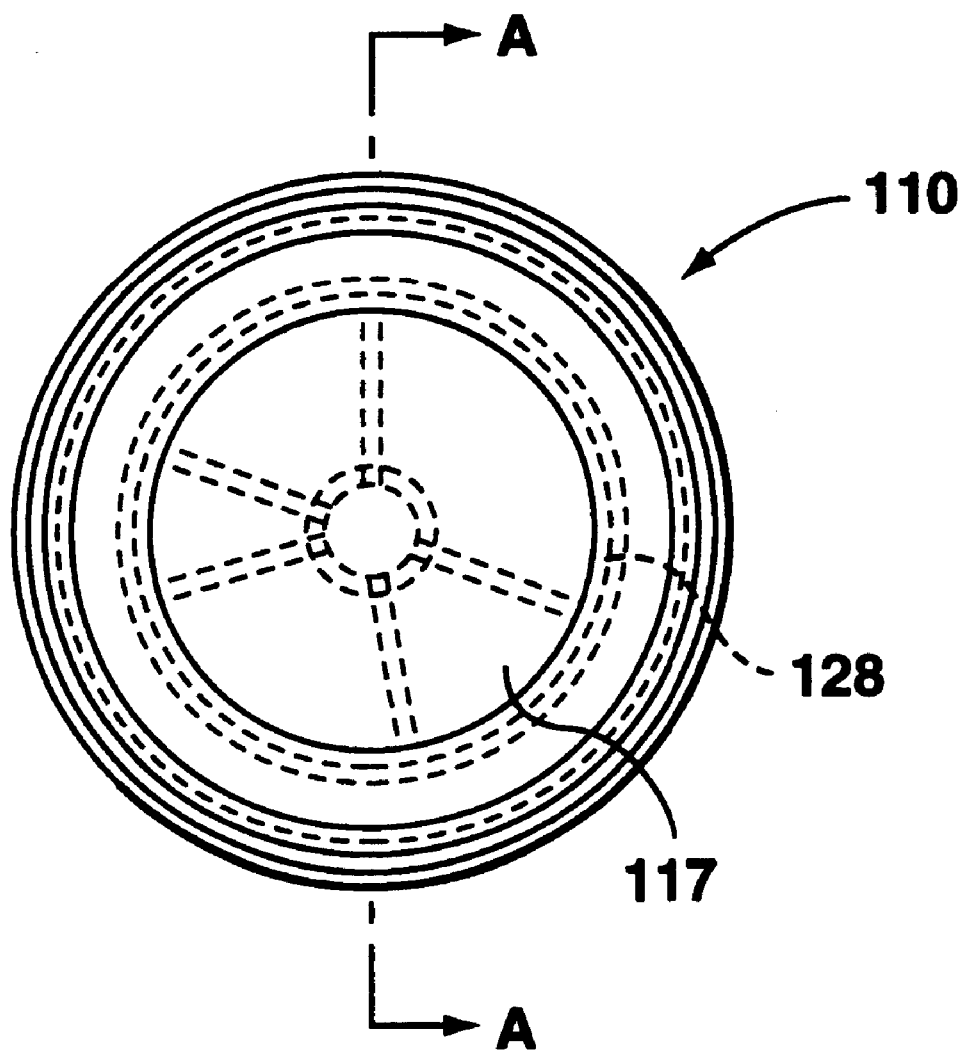
FIG. 5 shows an end view of another filtration module.

FIGS. 3 and 4 show how five groups, 24 a, b, c, d, e, of membranes 12 (not shown) create four stages of flow in both a forward and reverse direction. In general, and whether the feed water is flowing in a first direction or in reverse, dividers 26 collect the groups 24 of membranes 12 in preceding or succeeding stages (I, II, II etc.), some stages being both preceding and succeeding stages. The dividers 26 also leave open fluid connections created by the caps 20, 22 between the second end of each preceding stage and the first end of each directly succeeding stage. The fluid connections between stages permit an interstage flow of retentate/feed that is generally parallel to the periphery of the module 10. For example, with the pie or sector shaped stages illustrated, interstage flows flow around the centre of the module although it is not necessary that the interstage flows be perfect arcs. The surface area of the membranes of each preceding stage is between 1 and 2.5 times the surface area of the membranes of a directly succeeding stage and the surface area of the stages decreases from the first stage to the last stage. The exact sizes of the stages can be selected to provide a nearly uniform velocity through the module 10 despite permeation with limited variation in velocity between the stages. Other modules with more or less stages may be built. Modules with five to eight stages are useful where the feed pressure is low, for example where the feed is supplied by a municipal water supply to a residence and no supplemental feed pump is used. Modules with up to ten stages or more are likely possible, but the complexity of such a module in relation to the benefits gained would be a concern.

In the module 10 of FIGS. 3 and 4, the size of the groups are ⅛, ¼, ¼, ¼ and ⅛ respectively of the size of the entire amount of membranes. Dividers 26 comprise solid dividers 40 and one way dividers 42 in the locations shown. The one way dividers 42 open to allow flow in the direction shown. The dividers 26, 40, 42 divide the groups 124 into stages I, II, III and IV depending on the direction of feed flow.

In FIG. 3, feed flows first into group 24a through the module feed inlet 36 in the first cap 20. The feed also flows into group 24b and groups 24a and 24b together form stage I. Thus the module feed inlet 36 in the first cap 20 is connected in fluid communication with the first end of stage I. Feed/retentate flows to a second end of stage I at the second cap 22 where it flows over to a first end of group 24c which forms stage II. Feed/retentate is prevented from flowing back into stage I through the one way divider 42 by the greater pressure in stage I, a pre-requisite for having flow from stage I to stage II. Feed/retentate flows to the second end of stage II at the first cap 20 where it flows over to a first end of group 24d which forms stage III. Feed/retentate flowing to the second end of stage III flows to the second cap 22 where it flows over to a first end of group 24e which forms stage IV. Feed/retentate flowing to the second end of stage IV flows to the first cap 20 where it leaves the module 210 through the module retentate outlet 38. Through all stages, permeate flows from each stage directly to the permeate plenum (not shown) and out through the permeate outlet (not shown). Stages I, II, III and IV thus involve ⅜, ¼, ¼ and ⅛ of the total amount of membranes respectively.

In FIG. 4, the feed and retentate flows are reversed. When feed water flows into the module 10 in a reverse direction, the dividers 26, 40, 42 re-collect groups 24 of membranes 12 into second preceding and second succeeding stages by the action of liquid flowing through the module 10. In particular, feed flows first into group 24e through the module retentate outlet 38 in first cap 20. The feed may flow into group 24d and groups 24d and 24e form stage I. Feed/retentate flows in stage I to the second cap 22 where it flows over to group 24c which forms stage II. Feed/retentate in stage II flows back to the first cap 20 where it flows over to group 24b which forms stage III. Feed/retentate flowing in stage III flows to the second cap 22 where flows over to group 24a which forms stage IV. Feed/retentate in stage IV flows back to the first cap 20 where it leaves the module 10 through the module feed inlet 36. Stages I, II and III thus still involve ⅜, ¼, ¼ and ⅛ of the total amount of membranes respectively. As above, in some places undesired flow through the one way dividers 42 is prevented by the pressure gradient between phases I, II, III and IV.

To permit flow through the module 10 to change directions, feed and retentate pipes to and from the module 10 are provided with valves, typically solenoid valves, that allow each pipe to be connected to either the module feed inlet 36 or the module retentate outlet 38. The valves are operated simultaneously by a PLC or timer such that both the feed and retentate pipes are not both connected to the same point on the module 10 at the same time. Where the module 10 is used to soften water, the water to be filtered flows into a first end of the lumens of the membranes 12 which are chosen to selectively reject, ie. retain, hardness causing salts. A softened permeate is collected from the outer surfaces of the membranes 12 and a retentate is collected from the second end of the lumens of the membranes 12 and either exits the module 10 or flows to the next stage. Hardness causing salts thus build up in the lumens of the membranes 12, particularly in the last stage. Periodically reversing the direction of feed flow through the hollow fibre membranes, such that water to be filtered flows into the second end of the lumens and retentate flows out of the first end of the lumens, helps distribute this scaling more evenly and extend the life of the module 10.

Despite the advantage of reversing flow, modules can also be constructed to be used with flow in one direction only. Such modules may have a shorter service life than a module with reversing flow but are simpler to construct and, particularly for small systems, may be more cost efficient. FIGS. 5–9 show a second module 110 designed for flow in one direction through four stages. Again, other numbers of stages may be used and the stages can take other shapes.

A plurality of filtering hollow fibre membranes 12 are suspended between a first sectioned header 114a and a second sectioned header 114b. As before, the ends 16 of the membranes 12 are potted in a closely spaced relationship in the sectioned headers 114a,b such that their outer surfaces are sealed to the sectioned headers 114a,b, and their lumens are open at the distal faces 117, 119 of the sectioned headers 114a,b. A first endcap 112a (not shown) and a second endcap 122b cover the distal faces of the headers 114a,b. A first gasket 124 (not shown) fits between the first endcap 122a and the first sectioned header 114a. Similarly, a second gasket 126 fits between the second endcap 122b and the second sectioned header 114b. When the endcaps 122 are tightened, a seal is formed between the sectioned headers 114a,b and the endcaps 122 to seal the outer periphery of each sectioned header 114a,b to the adjacent endcap and to define a sealed plenum for flow between stages at each end of the second module 110. The thickness of the gaskets 124, 126 is chosen to be little more than the minimum required to avoid substantial head loss in the interstage flow which avoids unnecessarily increasing the feed/retentate side volume of the second module 110. It is desirable to avoid unnecessarily increasing the feed/retentate side volume of the second module 110 as this helps reduce the amount of cleaning solution required in some of the cleaning methods to be described below. Nevertheless, for large second modules 110, avoiding substantial head loss in the interstage flow may require thick gaskets, a combination of gaskets and spacers, or endcaps 122 hollowed out to increase the space available for interstage flow.

The second module 110 also has an outer casing 128. A supplemental casing 129 is secured to the ends of the outer casing 128 and provides threads for the end caps 122. The inner surfaces of both the outer casing 128 and supplemental casing 129 are grooved to provide a stronger connection with the sectioned headers 114 which are cured in place in the casings 128, 129. An optional central support tube 130 may be embedded in the second headers 114 to provide strength and support for the second module 110. The outer casing 128 is fitted with a permeate outlet 34. Alternately, the central support tube 130 may be porous between the sectioned headers 114 and either extended to protrude from the second module 110 or made to communicated with a central opening in one of the headers 114. In this way, permeate can be withdrawn through the central support tube 130 in place of the permeate outlet 34 in the outer casing 128. This avoids weakening the outer casing 128 by drilling holes for a permeate outlet and, in second modules 110 with an even number of stages, allows all connections (feed, permeate and retentate) to be made at one end of the second module 110.

Figure 6:
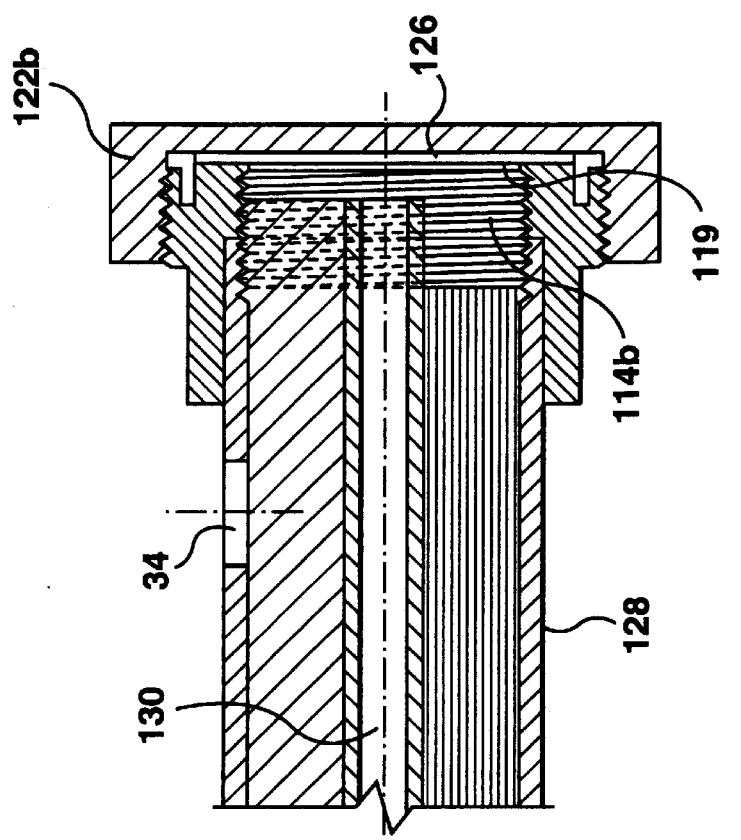
FIG. 6 shows a cross-section elevation of the filtration module of FIG. 5 taken along the lines A—A of FIG. 5.
Figure 9:
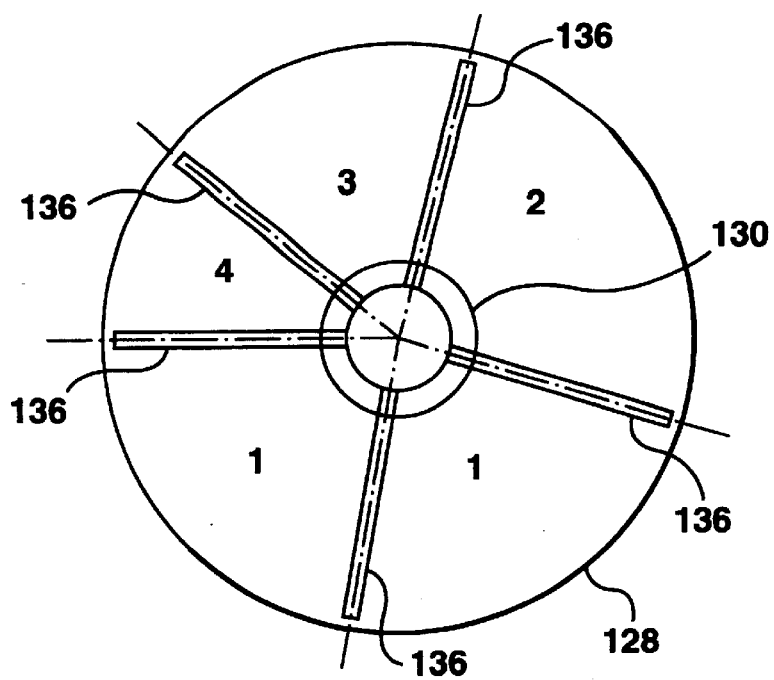
FIG. 9 shows a cross-section of dividers between the fibres of the filtration module of FIG. 5.

Referring to FIGS. 6 and 9 in particular, fins 136 optionally extend lengthwise along the length of the central support tube 130 and into the sectioned headers 114 and radially from the central support tube 130 to just short of the outer casing 128. The optional fins 136 assist in potting by containing the membranes 12 in sectors of a cylinder corresponding to the stages, which are numbered 1 through 4. This purpose can also be achieved with a spider in each of the sectioned headers 114. It is also possible to adequately pot the membranes 12 without the fins 136 or a spider and rely on the gaskets 124, 126 to define the stages. The fins 136 or a spider, however, make handling the membranes 12 easier (for example, stage 1 is split into two parts for ease of handling), reduce the number or likelihood of random membranes 12 crossing over between stages, and minimizes the number of membranes 12 wasted because one of their ends 16 is sealed by a gasket 124, 126. The fins 136 or a spider also cause the stages to be visible in the distal ends the sectioned headers 114 which allows the gaskets 124, 126 to be placed properly in relation of the stages without indexing means. Nevertheless, the gaskets 124, 126 may also be indexed to prevent them from being installed in the wrong orientation.

Figure 7:
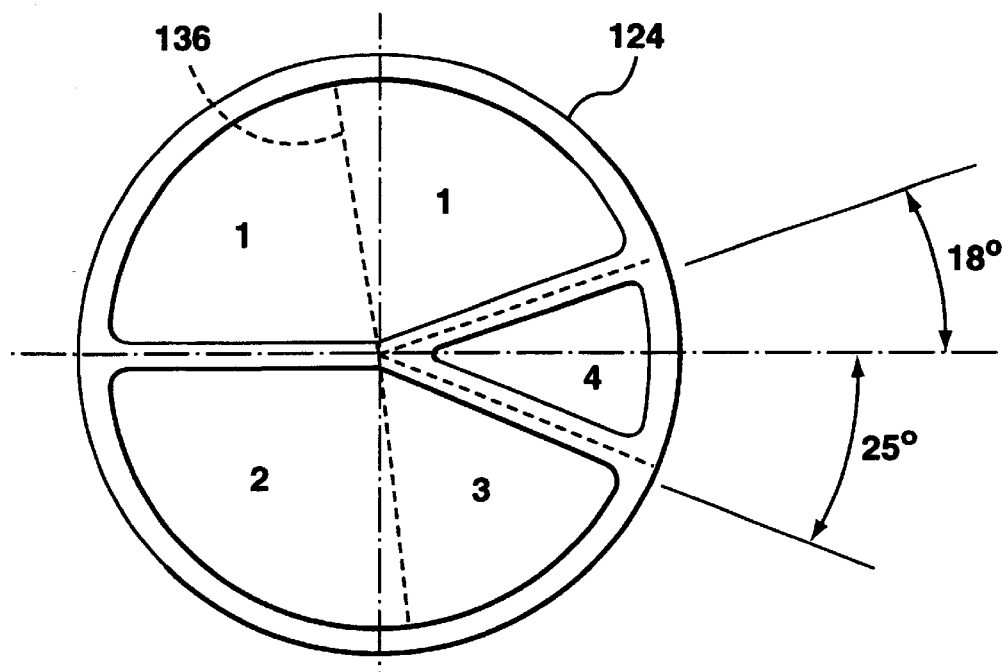
FIGS. 7 and 8 show first and second endcap gaskets for use in defining and separating the stages of the filtration module of FIG. 5.
Figure 8:
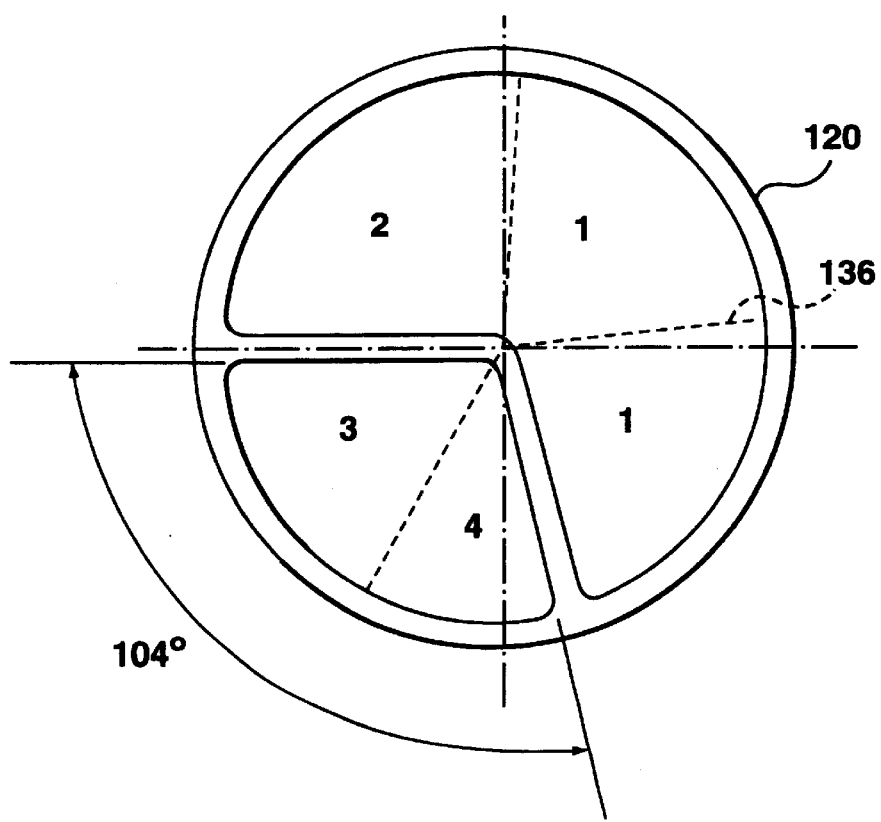

FIGS. 7 and 8 show the first gasket 124 and second gasket 126 in relation to the stages. The locations of the centres of the fins 136 are shown in dashed lines. The ratio of the surface areas of the stages is 3.8:2.4:1.2:1. A feed water inlet is drilled into the first endcap 122a to communicate with stage 1 after the first end cap 122a is secured in place. Similarly, a feed/retentate outlet (not shown) is drilled in the second end cap 122b to communicate with stage 4 after the second end cap 122b is secured in place.

Figure 10:
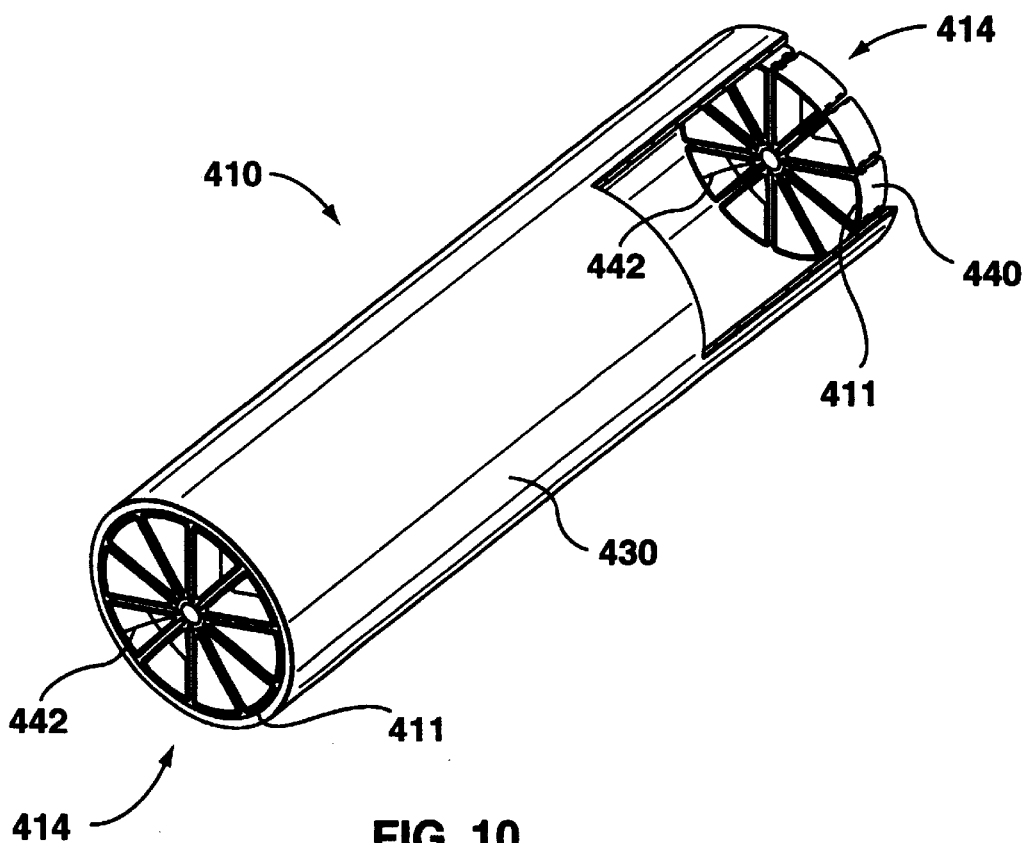
FIG. 10 is a partially cut-away isometric representation of parts of another filtration module.
Figure 11:
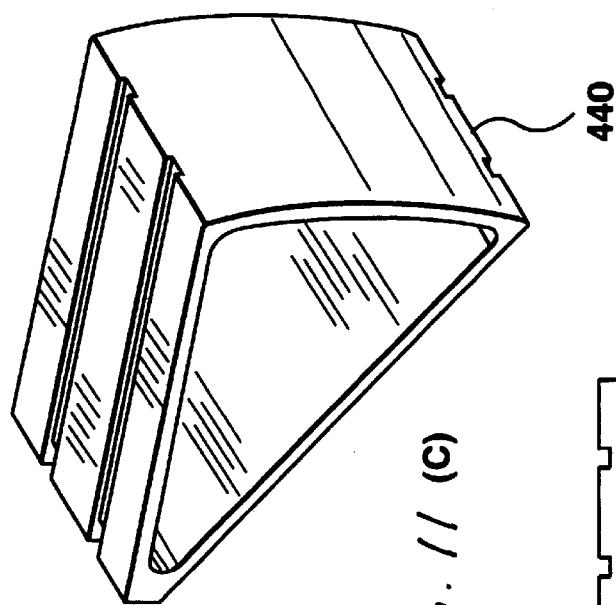
FIGS. 11A, B, C, D are plan, elevation and isometric views of collars for use with the module of FIG. 10.
Figure 11:
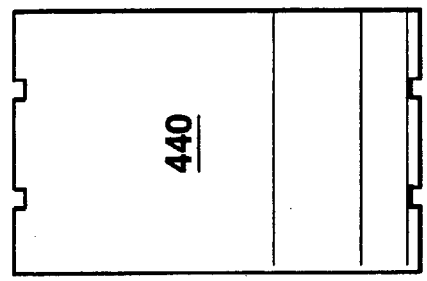
Figure 11:
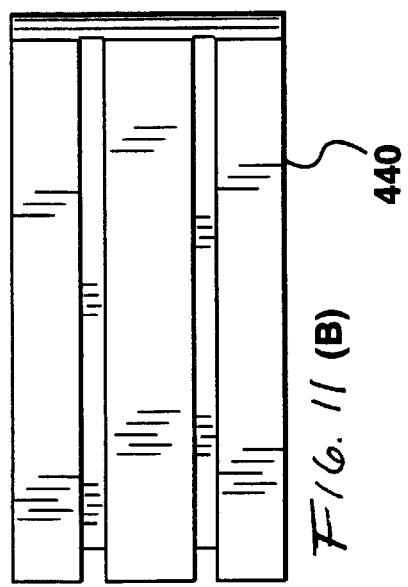
Figure 11:
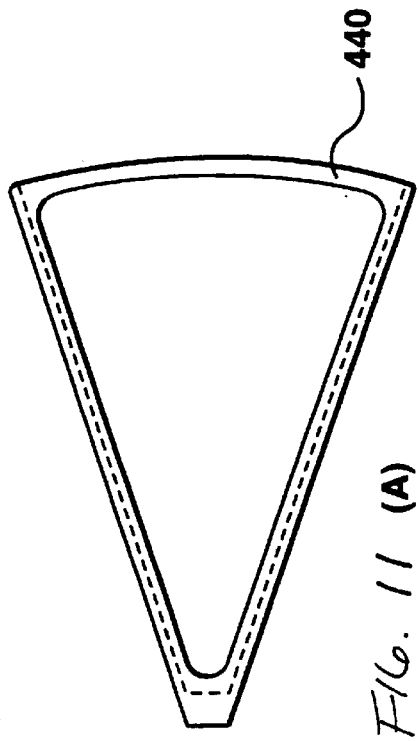

FIG. 10 shows parts of a third module 410. The design of the third module 410 is preferred for larger modules, for example modules over 3 or 4 inches in diameter. The design addresses the challenge of coating the inside of hollow fibre membranes 12 using conventional polyamide chemistry to make reverse osmosis or nanofiltration membranes 12 after the membranes 12 are potted. In particular, the module must be dried fully prior to coating but the membranes 12 are heat sensitive and cannot be dried at a high temperature. Excessive drying can also cause pore drying, which leads to a loss of permeability. In addition, the membranes 12 need to be dried after an amine application to formulate a stable polymer layer. The inventors have found that it is difficult to dry large masses of membranes, particularly if they are contained within a casing of a module. Satisfactory drying is most easily achieved with small, open units of membranes potted between headers which, if needed, can be fanned open to expose the fibre to air and to speed up the drying process.

The third module 410 is made up of a plurality (10 are shown) of elements 411. Each element 411 includes a set of membranes (not shown) potted into an opposed pair of collars 440. The collars 440 are preferably a sector of a cylinder, although other shapes may be used. The collars 440 limit the maximum size of the set of membranes 12 to a size that can be successfully coated. For example, the collars 440 may be shaped and sized so that no membrane 12 is more than about 35 mm from the edge of the bundle of membranes 12. Each element 411 may be potted individually, coated, and then the elements 411 assembled together to make a composite header 414 for the third module 410. Alternately, the elements 411 may be potted inside the third module 410 using the process described below, which makes it possible to separate the elements 411 from each other after they have been potted, coat the membranes 12 of each element 411 separately, and then reassemble the elements 411 into third modules 410. As in the second module 110, gaskets and end caps (not shown) are attached to the ends of the third module 410 to group the membranes into stages. The edges of the collars 440 provide natural separations between stages. If separations are required in other places, baffles 442 may be slipped into one or more pairs of collars 440 during potting. Thus the size of the collars 440 is selected for coating (particularly drying) considerations, but the number or size of stages is not limited by the size or number of collars 440.

With a single size and shape of element 411 to make the third module 410, coating and potting jigs and techniques can be created which assists in producing uniform quality third modules 410. Particularly when a large number of collars 440 are used, gaskets can be made to produce multi stage third modules 410 easily. For example, with 8 collars 440 per composite header 414, the third module 410 can be used to create a four stage module as shown in FIGS. 1–4 by using gaskets or dividers where the dividers 40, 42 are shown in those Figures.

The method of making a third module 410 will be described in detail below. The third module 410 shown is about 35 inches long between the distal faces of the composite headers 414 and uses an 8" diameter grey PVC pipe as a module casing 430. Each composite header 414 is made up of 10 collars 440, pairs of opposed collars with membranes potted in them forming 10 elements 411, each containing about 1600 hollow fibre membranes (not illustrated) of about 0.4 mm inside diameter.

Each element 411 is assembled in a jig which holds the distal faces of a pair of collars 440 about 35 inches apart. The membranes 12 are initially held together at their ends by an elastic band or other strap so that they can be inserted into the collars 440. The bundle of membranes 12 are held to the jig with another elastic band or strap and the jig is laid flat on a table. The membranes 12 are then cut so that they extend about 1 inch beyond the distal faces of the collars 440. The jig is then returned to vertical. To block the ends of the fibres, about 5 mm of silicone in a small dish or cup is brought up to the bottom ends of fibres. The silicone rises up to around 10 mm up fibres and surrounds each fibre. Any excess is drained off. Once the silicone has cured so as not to flow, the jig is turned over and the process repeated for the other side.

To pot the elements 411, all 10 elements 411 are placed into a potting die to temporarily form the two composite headers 414. The potting die is made in two halves so that elements 411 can be placed in each half as it lies on a table, leaving an appropriate space between the ends of the die and the distal faces of the collars 440. Appropriate temporary spacers may be placed between adjacent collars 440 or between the pairs of collars 440 in an element 411 to hold the collars 440 and membranes 12 in place. Once all elements 411 and any spacers are installed into both halves of the potting die, the two halves can be clamped together so that the elements 411 and spacers are squeezed tightly into place.

The assembled die is then placed in a centrifuge. The centrifuge is preferably equipped with a pouring jig for injecting resin through one or more ports. The resin can be applied to both ends simultaneously or in small amounts to alternate ends until the entire amount has been injected. The centrifuge will rotate at approximately 300 RPM which will apply no less than 40 G's of force to the resin. The centrifuge is shut off after the resin has cured enough to not flow and the die removed. Preferably, however, the third module 410 is not removed from the die until the resin has been cured fully. Alternately, the resin can be injected into each end of the potting die statically (without centrifuging). One end is potted first and then the module is turned 180° to pot the other end potted.

Once the resin has fully cured, the elements 411 are removed from the die but they are still glued together by a thin layer of resin. Excess resin is removed from the ends to reveal the open fibre ends, for example by cutting in a band saw. The band saw blade should slice through the resin just at the distal ends of the collars 440 leaving enough resin to hold the collars 440 together during the cut but allowing the elements 411 to be easily separated from each other.

After the elements 411 are separated from each other, each is tested for integrity and initial permeability by fitting temporary testing caps around each collar 440. During integrity testing, membranes 12 with low bubble points are cut open and sealed with silicone. These testing caps may also be used for leak testing, compaction, coating, and rejection/permeability testing.

To coat the membranes 12, they must first be dried. For this, one of the testing caps is removed to allow any excess liquid in the fibres to drain. The lumens are then purged with HEPA filtered air or nitrogen through one testing cap until the membranes 12 are slightly damp to the touch. The other testing end cap is then removed and the membranes 12 are fanned out to allow better air circulation between membranes 12 as they dry further in air which may take between about 30 minutes and an hour. With small elements 411, ie less than about 2" or 3" thick, an oven is not needed.

Coating may continue with the application of an amine solution, followed by drying as described above, followed by the application of an organic solution, followed again by drying as described above. Both solutions may be propelled into the lumens of the membranes 12 with nitrogen and held in the lumens for the required time by the testing end caps. After the lumens are coated, the membranes 12 may then be rinsed on the outsides with water and submerged in 30% glycerine solution to preserve the fibres followed by further drying as described above except that the elements 411 are placed in an oven after air drying. Once the elements 411 are dry, the testing end caps may be replaced and the elements 411 tested for permeability and rejection. The elements 411 are then re-soaked in glycerine and re-dried. The elements 411 can then be glued to each other and into the module casing 430 which, in this example, is grey schedule 40 PVC pipe.

Filtration and Cleaning Systems and Filtration Processes

Figure 12:
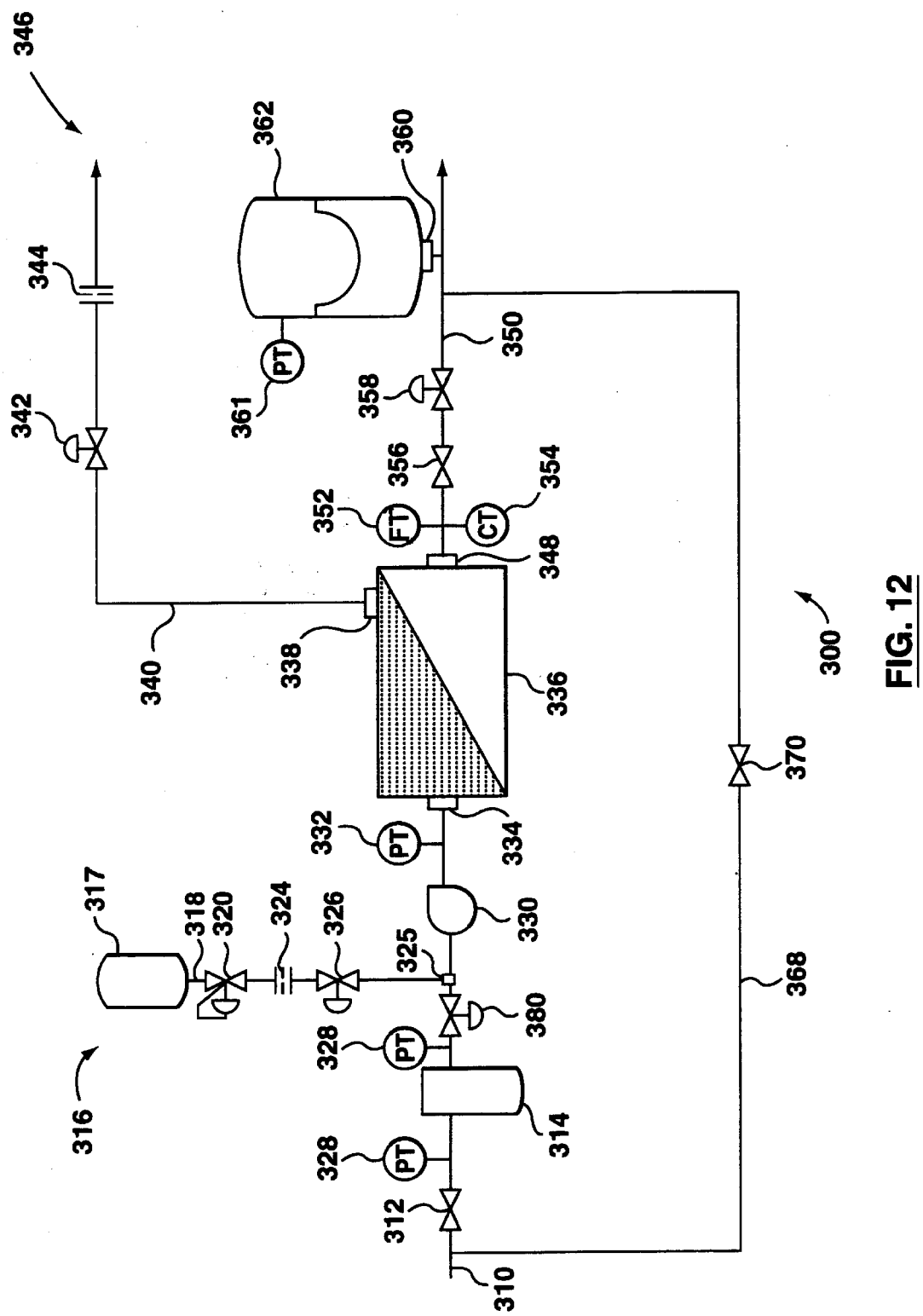
FIG. 12 is a schematic representation of a filtration system in accordance with the present invention.

In FIG. 12, a filtration apparatus is shown generally at 300. The filtration apparatus 300 is particularly suited for use at the point of entry of a residence, a small group of residences, or a small commercial building. The apparatus 300 produces a filtered and, optionally, a softened permeate by removing suspended solids and, optionally, hardness causing salts. The apparatus 300 comprises a filtration module 336 having a feed water inlet 334 for introducing feed water, a retentate outlet 338 for removing retentate, and a permeate outlet 348 for removing treated permeate. The filtration module 336 may be of various types of nanofiltration or reverse osmosis modules which are known in the filtration art. For example, the filtration module 336 may be a spiral wound nanofiltration membrane module or a collection of such modules or a plurality of hollow fibre membranes which may be in accordance with one of modules 10, 110, 210 or 410 previously described herein.

A feed water passageway 310 is fluidly connected to the feed water inlet 334 of the filtration module 336. The apparatus 300 further comprises a cleaning chemical addition system 316 for injecting one or more cleaning chemicals into the feed water passageway 310 upstream of the filtration module 336. The cleaning chemical addition system 316 is operable to supply a fluid containing a cleaning chemical into the feed water passageway 310. The fluid may be a liquid, which may be an acid such as citric acid or carbonic acid, or a gas, such as carbon dioxide gas.

The cleaning chemical addition system 316 can have many forms. Where the cleaning chemical is a liquid such as citric acid, various means such as dosing pumps or a reservoir connected to a venturi in the feed water passageway 310 may be used. Where the cleaning chemical is carbon dioxide gas or carbonic acid made by dissolving carbon dioxide gas in feed water, the cleaning chemical addition system 316 may be as shown in FIG. 12. In FIG. 12, a pressurized gas cylinder 317 is adapted to hold food grade compressed carbon dioxide gas. A carbon dioxide passageway 318 fluidly connects the carbon dioxide cylinder 317 to the feed water passageway 310 at a point upstream of the filtration module 336. Preferably, the point where the carbon dioxide passageway 318 connects to the feed water passageway 310 is also upstream of any pumps, valves etc. that would benefit from carbon dioxide cleaning. A carbon dioxide pressure regulator 320 and/or a carbon dioxide flow controller 324 may optionally be included downstream of the cylinder 317 to aid in maintaining a suitable gas pressure and flowrate. Flow of carbon dioxide is also turned on and off by a carbon dioxide valve 326, preferably a solenoid valve, located between the cylinder 317 and the feed water passageway 310. The carbon dioxide valve 326 may be linked to one or more of a microprocessor, a timer or a pressure sensor as required by the various cleaning regimes described below. Where cleaning with carbon dioxide in solution is desired, an optional carbon dioxide bubbling device 325 is used to firm fine bubbles where the carbon dioxide is introduced into the feed water to achieve rapid dissolution of the carbon dioxide gas. The carbon dioxide bubbling device 325 may consist of porous hollow fibre membranes or ceramic porous tubes or a packed bed with ceramic or stainless steel packing material.

A prefilter 314, preferably comprising a suitable filter media and an activated carbon column, may be located upstream of the filtration module 336. The filter media removes particulate matter, typically particulate matter having a diameter of more than about one tenth of the internal diameter of the membranes 12. The activated carbon column removes chlorine. One or more prefilter pressure transmitters 328 may optionally be employed to monitor the pressure of the feed water and the head loss through the prefilter 314.

The feed water entering the filtration module 336 is pressurized, typically to between 40 psi and 200 psi. The source of feed water may be a pressurized municipal supply line 310 or a well pump (not shown). If the source of feed water is a pressurized municipal supply, the apparatus 300 may include a water pump 330 upstream of the filtration module 336 to increase the pressure at the feed water inlet 334. Where a water pump 330 is used, a pump pressure transmitter 332 may optionally be employed to monitor the pressure just upstream of the filtration module 336.

A retentate passageway 340 fluidly connects the retentate outlet 338 to a drain 346. Retentate removal is stopped or started by a valve 342 which is preferably a solenoid valve. The retentate passageway 340 also includes a retentate flow control mechanism 344, such as a flow orifice, a variable area flow orifice or a control valve, to aid in regulating the retentate flowrate. The retentate flow control mechanism 344 most directly controls the recovery ratio (ratio of permeate produced to feed introduced) of the filtration apparatus 300. While a single area orifice is sufficient in some installations, a variable device is useful for cleaning methods, described below, performed in the absence of permeation and for maintaining better control over the recovery ratio. In particular, it is preferred if the retentate control mechanism 344 maintains a minimum rate of flow of retentate as the differential between feed pressure and permeate pressure decreases subject to the need to keep a desired minimum feed/retentate velocity as discussed below.

A permeate passageway 350 is fluidly connected to the permeate outlet 348 of the filtration module 336. The permeate passageway 350 may be connected directly to a permeate distribution system or to a buffer tank, preferably a tank which in which the pressure increases as the volume of permeate in the tank increases. For example, a diaphragm tank 362 having a tank inlet 360 may be employed downstream of the filtration module 336. A pressure transmitter 361 may monitor the pressure in the diaphragm tank 362.

The apparatus 300 may also include a system bypass valve 356 located downstream of the filtration module 336 to isolate the user from any permeate which may be produced during cleaning or module failure, replacement or maintenance. When the system bypass valve 356 is closed and bypass valve 370 located in a bypass passageway 368 is opened, the bypass passageway 368 fluidly connects the feed water passageway 310 and the permeate passageway 350.

The apparatus 300 produces a filtered and, optionally, a softened permeate by retaining suspended solids which may include pathogens, heavy metals or hardness causing salts. During filtration, valves 312, 342, 356, and 358 are open and bypass valve 370 is closed. Initially, the feed water passes through the feed water passageway 310. Optionally, the water pump 330 increases the feed pressure at the feed water inlet 334. Thus, pressurized feed water is supplied to the feed side of the module 336, permeate is collected as it leaves the outer surface of the membranes via permeate outlet 348, and a concentrate or retentate exits via retentate outlet 338 continuously during permeation. The filtered permeate travels through the permeate passageway 350 and optionally into the pressurized diaphragm tank 362 or to the user directly depending on whether a pressurized diaphragm tank 362 (or other similar tank) is used and the demand for permeate from time to time. The flowrate of the retentate is controlled by retentate control mechanism 344. In an industrial or commercial setting, the apparatus 300 will typically be operated substantially continuously. However, operation will depend on the design parameters, the operation parameters, the capacity of the system, and the demands placed on the system. The apparatus 300 may include a flow transmitter 352 located downstream of the filtration module 336 to monitor the rate of permeate production and a conductivity sensor 354 for monitoring the integrity of the system.

In one embodiment, the apparatus 300 is used to provide filtered and softened water for a single house. The filtration module 336 is a multi-stage module 10, 110, 410 as described above. The membranes 12 have a minimum permeability of 0.1 gfd/psi and a minimum hardness rejection of about 75%. The filtration module 336 has between 100 and 500 square feet of membrane surface area divided into between 5 and 8 stages, preferably between 6 and 8 stages. Filtration is performed in a single pass without retentate recycle at a low minimum feed/retentate velocity and a high recovery. Typically, the feed/retentate has a minimum velocity of between 0.15 to 0.6 ft/s, more typically between 0.2 ft/s and 0.3 ft/s. The feed pressure is between 60 psi and 150 psi. This pressure may be available from the municipal water supply to the house without the use of a water pump 330.

In this embodiment, the apparatus 300 will typically be operated for between 1 to 6 hours/day, more typically between 2 to 3 hours/day. Filtration is controlled by the tank pressure transmitter 361 operating through a programmable logic controller or a circuit (neither shown) connected to the various valves. The tank pressure transmitter 361 causes filtration to start at a selected minimum pressure and stop at a selected maximum pressure. When filtration stops, the water pump 330, if any, (or a well pump if applicable) is shut off and valves 342 and 358 are closed.

The permeate passageway 350 may be in flow communication with a household supply line (not shown). Preferably, however, a diaphragm tank 362 is used. The apparatus 300 may operate for extended periods of time, but at a feed water flowrate of between 0.5 gal/min to 7.0 gal/min, and more preferably between 1 gal/min and 3 gal/min. Accordingly, the diaphragm tank 362 is used to store the treated permeate until it is needed by the user. The diaphragm tank 362 is fluidly connected to the permeate passageway 350 via tank inlet 360. Downstream of the pressurized diaphragm tank 362, the permeate passageway 350 leads into a household supply line. The diaphragm tank 362 may hold between 5 and 100 gal of water, typically between 30 and 70 gallons and more typically between 50–60 gallons.

Cleaning Processes

To provide cleaning and reduce scaling to extend the life of a reverse osmosis or nanofiltration module, various methods to be described below provide a cleaning chemical to such a module. These methods are particularly useful where the module is used to produce a softened permeate and the cleaning chemical is also used to control scale. To reduce carbonate scaling, the cleaning chemical is preferably an acid or a substance that creates an acid in water.

Example cleaning chemicals include citric acid which removes scaling and is also effective at removing some metals. Carbon dioxide may also be used and is surprisingly effective at removing carbonate scaling. Carbon dioxide is also self limiting for very hard waters with buffering capability, that is excessive dosages do not result in very low pH and potentially unsafe water quality. Further, food grade carbon dioxide is suitable for human ingestion and available as a compressed gas in cylinders for use by individuals in a domestic setting. The pH of carbonic acid applied to the module may be between 4.5 and 6.5, typically between 5.0 and 6.0. The pH of citric acid applied to the module is typically between 2.5 and 3.0.

Various methods of cleaning can be used to clean or reduce scaling in the filtration module 336. In a continuous while permeating method, the cleaning chemical addition system 316 is opened to add cleaning chemical continuously throughout filtration. Where the cleaning chemical is carbon dioxide, the carbon dioxide valve 326 is linked to the tank pressure transmitter 361 to open whenever valves 342 and 358 are open, ie. to open at the selected minimum pressure and stop at the selected maximum pressure. The carbon dioxide flow controller 324 is set to introduce a desired flow of carbon dioxide. The carbon dioxide pressure regulator 320 and carbon dioxide flow controller 324 may be pre-set to a single setting expected to be adequate over a variety of operating conditions. Optionally, the carbon dioxide pressure regulator 320 and carbon dioxide flow controller 324 may be linked to respond to one or more of the absolute pressure of the feed, the pressure differential between the feed and the permeate or the permeate flow rate to provide a more nearly constant rate of carbon dioxide injection per volume of feed water.

The amount of cleaning chemical to add is chosen to inhibit fouling of the membranes as required to allow them to have adequate permeability for their expected life span per installation which is typically between six months and a year. At the end of this time, the membranes may be removed for intensive cleaning. For example, carbon dioxide may be added such that the Langlier Index is zero or slightly negative, at which point the feed water is non-scaling and only minimally corrosive. The carbon dioxide converts the scale forming insoluble calcium carbonate into soluble calcium bicarbonate. As such, the addition of carbon dioxide lowers the concentration of the insoluble calcium carbonate, thus reducing the rate of scale formation. Residual excess carbon dioxide in the feed water may also clean already scaled membrane surfaces and restore at least a portion of the permeability of the membrane. Because the concentration of scale forming salts increases in later stages of a multi-stage filtration module 336, it is possible that scale formation will not be a concern in the first stage or stages of the filtration module 336. In such a case, the carbon dioxide passageway 318 may be relocated to feed directly into the filtration module 336 upstream only of later stages or upstream of only the last stage which will allow less carbon dioxide to be used. Carbon dioxide requirements can also be reduced by splitting the carbon dioxide passageway 318 to inject carbon dioxide both into the feed water passageway 310 and the filtration module 336 upstream of a later stage or stages.

In a discontinuous while permeating method, a cleaning chemical is added to the feed water periodically. Carbon dioxide, for example, can be added for between 5 and 30 minutes at one to three hour intervals. This is accomplished in a continuously operated filtration system 300 by connecting the carbon dioxide valve 326 to a timer or microprocessor (not shown). Where the filtration system is not operated continuously, the timer or microprocessor is linked to the tank pressure transmitter 361 so as to advance time only when valves 342 and 358 are open and to close the carbon dioxide valve 326 whenever the valves 342 and 358 close.

Other cleaning methods are conducted from time to time while permeation is stopped. These methods are typically performed periodically. For example, carbon dioxide cleaning may be performed for 10 to 30 minutes at one to four hour intervals in continuously operated industrial or commercial systems to inhibit fouling and remove small amounts of scale which may have formed since the last cleaning. Alternately, cleaning may be performed at longer intervals, ie. once a day, but performed to provide more intensive descaling with each cleaning. The once a day cleaning is particularly useful in residential applications as it can be performed at a time when demand for water is usually low, for example between 2:00 am and 4:00 am. In general, the frequency and intensity of cleaning will depend on the design parameters, the operation parameters, the capacity of the system, and the demand on the system.

In a continuous without permeating method, a timer or microprocessor (not shown) initiates the cleaning steps at the selected times. The permeate valve 358 is closed but the retentate valve 342 remains open and feed continues to be supplied. The cleaning chemical addition system 316 is operated to introduce cleaning chemical into the feed water which is flowed through the feed/retentate side of the filtration module 336. For example, with carbon dioxide, the carbon dioxide valve 326 is opened to introduce carbon dioxide into the feed as it flows through the feed/retentate side of the filtration module 366. The retentate flow control mechanism 344, if it is variable, may be more fully opened briefly shortly after cleaning begins to speed the flow of carbon dioxide into the filtration module 366 until carbon dioxide extend throughout the module. The retentate flow control mechanism 344 and/or the carbon dioxide pressure regulator 320 or carbon dioxide flow controller 324 may then be adjusted to provide a desired concentration and contact time of carbon dioxide.

In a hold and flush method, a timer or microprocessor (not shown) again initiates the cleaning steps at the selected times. The permeate valve 358 is closed but feed flow continues. The retentate valve 342 is opened briefly to flush retentate from the module 336 at the same time as the cleaning chemical addition system 316 to inject cleaning chemical into feed water flowing into the filtration module 336. For example, the carbon dioxide valve 326 is opened. Both valves remain open until carbon dioxide travels through most of the feed/retentate side of the filtration module 336, preferably at least until it reaches the retentate outlet 338. The retentate valve 342 is first closed, and the pressure on the feed/retentate side of the filtration module 336 is allowed to increase to the feed water pressure after which the carbon dioxide valve 326 is closed. The carbon dioxide laden water is held in the filtration module from between 1 to 60 minutes, typically between 10 and 30 minutes. Citric acid reacts more slowly and the hold time is typically between 1 and 2 hours. After the requisite time, the apparatus 300 is returned to filtration and control is returned to the tank pressure transmitter 361. Before filtration is resumed, the contents of the filtration module 336 may be flushed out of the apparatus 300 by opening the retentate valve 342 briefly and flowing feed water through the filtration module 336. This step is not typically necessary since the carbon dioxide will have been substantially used up. Further, in residential systems as described above, where the cleaning is performed at off-peak times, water is unlikely to be required immediately and any residual carbon dioxide merely continues to react with scale.

Cleaning With Carbon Dioxide Gas

In another cleaning method, the filtration module 336 is cleaned by holding pressurized carbon dioxide gas on the feed/retentate side of the filtration module 336. Referring to FIG. 12, the cleaning chemical addition system 316 may be used as shown except that no carbon dioxide bubbling device 325 is required.

To perform this cleaning method, the filtration module 336 is first isolated from the feed supply line 310 and the permeate line 350 by closing the feed valve 380 and the permeate valve 358. The carbon dioxide valve 326 and the retentate valve 342 are opened for a period of time selected to permit carbon dioxide gas to substantially displace the feed/retentate in the filtration module 336. For example, all feed/retentate can be displaced from the feed/retentate side of the filtration module 336 but for feed/retentate held by surface tension in the pores of the membranes 12 or in a film along the surfaces of the membranes 12 or other parts of the feed/retentate side of the filtration module 336. Regulator 320 is adjusted to maintain a gas pressure in the range from 10 kPa to 100 kPa, typically 10 to 50 kPa. Once the feed/retentate is displaced, the retentate valve 342 and the carbon dioxide valve 326 are closed and the gas filled filtration module 336 is allowed to stand for 1 to 40 minutes, typically for between about 5 to 30 minutes, while the carbon dioxide reacts with the scale forming compounds. The filtration module 336 is then flushed by opening the feed valve 380 and retentate valve 342. The filtration module 336 is flushed with between 1 and 10, preferably between 1 and 2, times the volume of the feed/retentate side of the filtration module 336 before flushing is stopped by closing one or both of the feed valve 380 and retentate valve 342. The cycle of holding carbon dioxide gas in the filtration module 336 and then flushing with feed water is repeated from 1 to 5 times depending on the degree of fouling. When this cleaning method is used as a maintenance cleaning strategy, cleaning is performed when the filtration module 336 has fouled to about 80–90% of its initial permeability and 1 or 2 cycles are typically adequate. Under other cleaning strategies, cleaning is performed when the filtration module 336 has fouled to about 30–80% of its initial permeability and 2 to 5 cycles are typically required.

In a flush and hold method, the gaseous carbon dioxide cleaning method substantially reduces the amount of carbon dioxide required compared to dissolving the carbon dioxide in the feed water. This is because the carbon dioxide is dissolved only in water held in the pores or on the surface of the membranes 12. For example, with an experimental filtration module 336 having about 500 hollow fibre membranes 12 of about a meter in length in a pilot filtration system, a flush and hold cleaning cycle with carbon dioxide gas dissolved in feed water typically requires about 1 to 2 Std. L while a flush and hold cleaning cycle with carbon dioxide gas admitted directly into the filtration module 336 uses only about 0.07 to 0.1 Std. L per cycle with similar cleaning results. In commercial embodiments, the inventors expect that the difference in carbon dioxide usage will be less, but that using carbon dioxide gas in a flush and hold method will still require about one half of the carbon dioxide required for a flush and hold method using carbon dioxide dissolved into feed water for the same cleaning results. In some embodiments, operational considerations and the cost of control devices may favour the use of carbon dioxide dissolved into feed water but, in other circumstances, the reduction in carbon dioxide consumption favours using carbon dioxide gas directly.

The methods above may be combined, for example by providing continuous addition of cleaning chemical to the feed while permeating and periodic intensive descaling while permeation is stopped. The methods above may also be advantageously combined with flow reversal as described further above, particularly in relation to those modules 10 which reconfigure their stages when flow is reversed. With carbon dioxide continuously added to the feed, the supply of cleaning chemical switches between the module feed inlet 334 and the module retentate outlet 338 along with the feed water. Thus, the first and last stages of the module 336 alternate between relatively low hardness water with high cleaning chemical concentration and relatively high hardness water with low cleaning chemical concentration, the cleaning chemical concentration decreasing with travel through the module 336. Thus the cleaning chemical is added to the feed flow while the feed flows first into the most heavily scaled part of the module at least during a period right after the flow is reversed.

With cleaning chemical added periodically, the flow reversal is also done only periodically and timed to coincide with the addition of cleaning chemical to the feed. Thus, for most of the day feed flows in the forward direction and scale builds up in the last stage. During an off-peak period, flow is reversed and cleaning chemical is added to the feed. Thus the cleaning chemical is added to the feed flow while the feed flows first into the most heavily scaled part of the module.

EXAMPLES

Example 1

Figure 13:
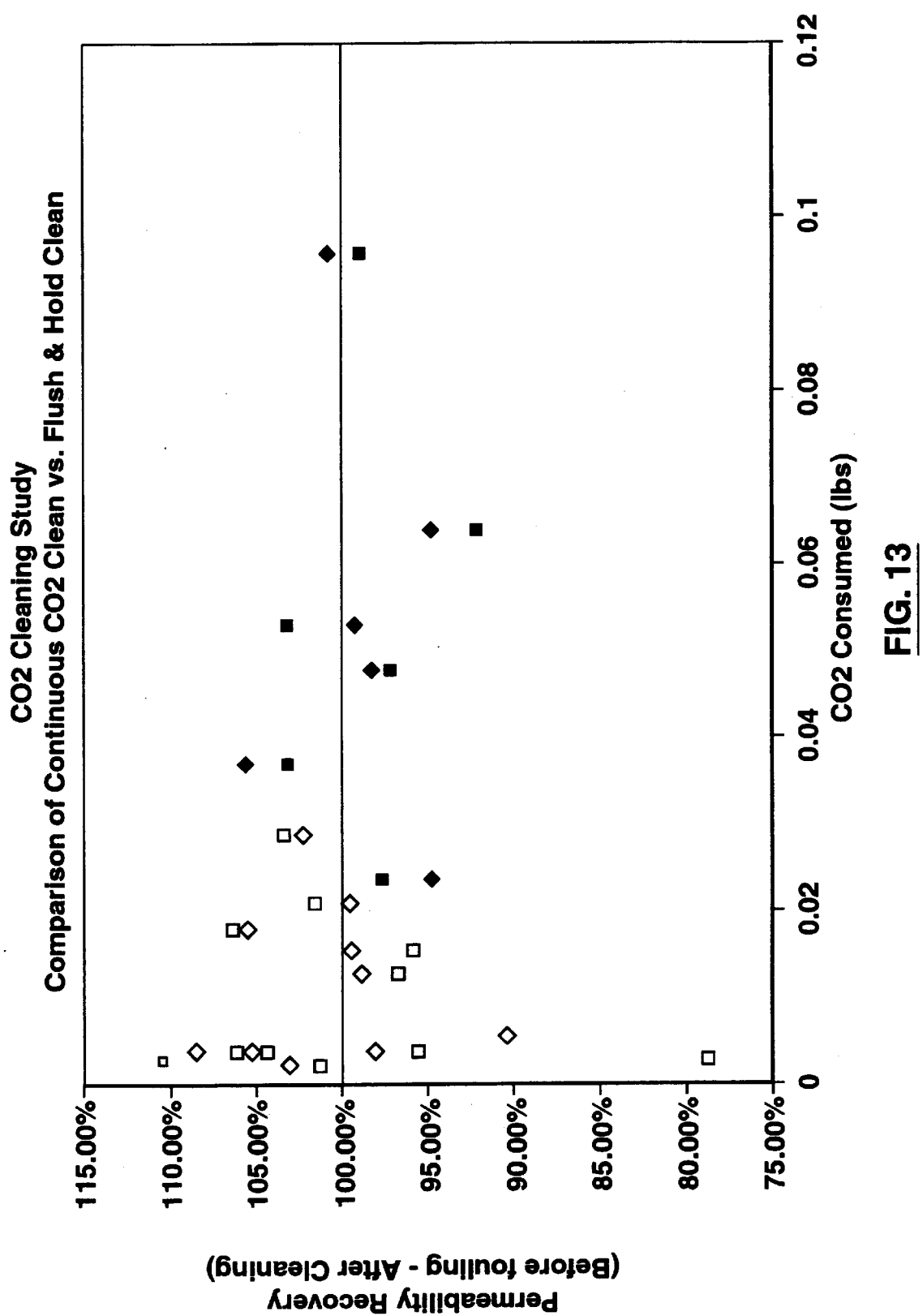
FIG. 13 is a graph which compares the carbon dioxide consumption between different membrane cleaning methods.

FIG. 13 is a graph which compares the carbon dioxide consumption between two cleaning methods performed while permeation is stopped, the first method being the continuous without permeation method and the second being the hold and flush method. The y-axis relates to the permeability recovery, and the x-axis relates to the carbon dioxide consumed in pounds (lb). The solid diamond and the solid square refer to two modules which were descaled in the continuous without permeation method. The outlined diamond and outlined square refers to the same two modules descaled in the hold and flush method. The membranes were fouled by operating them for 16 hours with a synthetic feed solution at a feed pressure of 100 psi, a temperature of between 7–10° C. and an exit retentate velocity of 0.19 ft/s. The cleaning conditions included: a feed pressure of 100 psi, a temperature of between 20–25° C., a feed of industrial water laden with carbon dioxide bubbles and a pH between 6.0 and 5.5, an velocity of 0.64 ft/s (during flushing or continuous without permeation cleaning), a flush time of 1 minute, a hold time of between 1–40 minutes, and a flow time (in the continuous without permeation method) of between 5–30 minutes. The two modules have slightly different characteristics, as outlined in the table below.

| Membrane Property | Module A (shown by diamond symbols) | Module B (shown by square symbols) |
| --- | --- | --- |
| Surface Area (m2) | 0.804 | 0.801 |
| Cross-Sectional Area (m2) | 0.86 E-5 | 0.85 E-5 |
| Permeability (L/m2/h/bar) | 3.75 | 4.08 |
| Total Hardness Rejection (%) | 70.4 | 74.2 |

Both methods were successful in descaling the modules. However, the general trend suggests that the hold and flush method requires much less carbon dioxide than the continuous method.

Example 2

Figure 14:
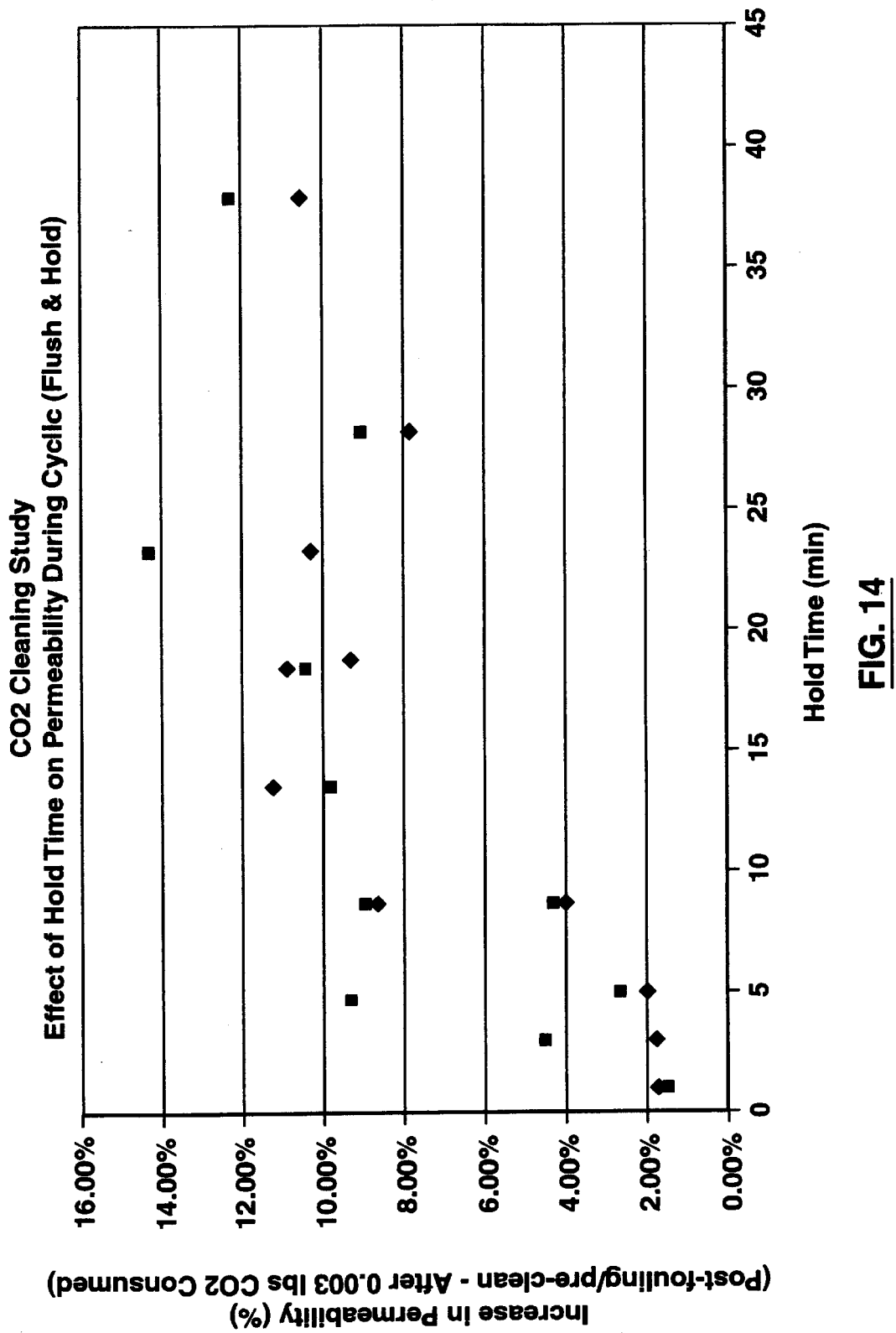
FIG. 14 is a graph which compares the effect of hold time on the permeability of the membrane in a hold and flush membrane cleaning method.

FIG. 14 is a graph which compares the effect of hold time on the permeability of the membrane for the hold and flush method. The y-axis relates to the percentage increase in permeability, and the x-axis relates to the hold time in minutes. In these experiments, all of the membranes were fouled for 16 hours with a synthetic concentrated solution at a hardness of 1200 mg/L as CaCO3 solution to simulate the last stage of a multi-stage module operating at an 80–90% recovery rate. Each data point shows the amount of permeability increase achieved after the consumption of 0.003 pounds of carbon dioxide. The test conditions for the fouling of the membranes included: a feed pressure of 100 psi, a temperature of about 7–10° C., a duration of 16 hours, a synthetic feed solution, and an exit velocity of 0.19 ft/s. The test conditions for the cleaning of the membranes included: a feed pressure of 100 psi, a temperature of about 20–25° C., a feed stream comprising industrial water and carbon dioxide at a pH between 5.5 and 5.0, an exit velocity of 0.64 ft/s during flushing, a flush time of 1 minute, and a hold time of between 1–40 minutes. Two modules having different characteristics were tested, as outlined in the table above. The graph suggests that there is declining marginal increase in the permeability of the membrane beyond a hold time of about 15 to 20 minutes.

Example 3

FIG. 15 illustrates a graph which shows the effect of feed/retentate exit velocity of a single stage filtration module on the permeability of the filtration module. The y-axis relates to permeability in $L/m^2/h/bar$, and the x-axis relates to exit velocity in ft/s. The test conditions included: a module pressure of 100 psi, a temperature between the range of 25–30° C., a duration of 4–6 hours, and a synthetic feed solution of 1200 mg/L total hardness as $CaCO_3$ to simulate the last stage of a multi-stage module operating at an 80–90% recovery rate. Modules with three different dimensions were included in the trial. The details of the modules are set out in the table below.

| Membrane Property | Module A (diamond symbol) | Module B (square symbol) | Module C (triangle symbol) |
|---|---|---|---|
| Surface Area (m2) | 0.808 | 0.797 | 0.621 |
| Cross-Sectional Area (m2) | 8.55 E-5 | 8.48 E-5 | 8.16 E-5 |
| Permeability (gfd/psi) | 0.097 | 0.149 | 0.122 |
| Total Hardness Rejection (%) | 88 | 79.4 | 81.4 |

The graph illustrates that above an exit velocity of about 0.2 ft/s (which is the minimum feed/retentate velocity), there does not appear to be any appreciable effect on the permeability of the membranes of an increase in exit velocity. Rapid scaling, as exhibited by a drop in permeability occurs at exit velocities below about 0.15 ft/s.

Example 4

0.5 mm internal diameter coated nanofiltration membranes which selectively reject (ie. retains) hardness causing salts were used in a series of four tests. In the tests, the membranes were used to filter and soften a very hard and scaling feed water with total hardness exceeding 3000 mg/L. After six hours of operation, flux through the membranes had dropped noticeably to varying degrees. A carbon dioxide solution with a pH of 6.3 was circulated through the membranes. Flux through the membranes recovered completely in three of the tests.

Example 5

Two Desal DL1812 spiral wound nanofiltration modules were operated at 50% recovery and approximately 99 psi TMP. The feed was scale forming in nature with a positive Ryznar index. Carbon dioxide was injected continuously into the feed of one of the modules to reduce its pH from 8.0 to 6.5. The flux of the module without carbon dioxide added to the feed stabilized at 0.20 gfd/psi. The flux of the module with carbon dioxide added to the feed stabilized at 0.26 gfd/psi, a 30% improvement.

Example 6

Carbon dioxide gas cleaning was tested with a nanofiltration module of hollow fibre membranes. The module had about 600 fibres having an internal diameter of about 0.4 mm and a total surface area of about 0.8 $m^2$. The module was used to filter feed water having total hardness as $CaCO_3$ of between 1500 and 1700 mg/L. The minimum feed/retentate velocity in the fibres was about 0.06 m/s. Cleaning was performed after closing valves in the feed and permeate lines. A source of pressurized carbon dioxide gas was then connected to the retentate discharge line and a drain valve opened in the feed line to allow carbon dioxide gas to displace the feed/retentate in the module. The carbon dioxide gas was held in the module at a pressure of 50 kPa for 20 minutes. The module was then flushed with low hardness water. The cycle of holding pressurized carbon dioxide in the module and flushing the module was repeated two more times. The module was then returned to service.

Initial permeability of the module was 2.8 $L/m^2/h/bar$. After a period of filtration, the permeability of the module was 2.4 $L/m^2/h/bar$. Permeability of the module after cleaning with carbon dioxide gas was 2.8 $L/m^2/h/bar$. Thus carbon dioxide gas cleaning successfully restored the module to its initial permeability.

Example 7

A module of hardness rejecting nanofiltration membranes with a surface area of 0.76 $m^2$, total hardness rejection of 76% and a base-line permeability of 2.11 $L/m^2/h/bar$ was fouled with a synthetic solution of hard water. At the end of the fouling period, the module permeability was measured and was 1.65 $L/m^2/h/bar$. The module was then cleaned using the flush and hold method with a solution of carbon dioxide in the synthetic solution of hard water. The flush involved a flow of between 2 and 3 times the feed/retentate side volume of the module and the hold time was 20 minutes. After the cleaning, the permeability of the module was measured using the synthetic solution of hard water and was 1.92 $L/m^2/h/bar$. The same module was fouled again with a synthetic solution of hard water. At the end of the fouling period, the module permeability was 1.6 $L/m^2/h/bar$. The module was then cleaned using the flush and hold method with carbon dioxide gas. The hold time was 20 minutes. After the cleaning, the permeability of the module was measured using the synthetic solution of hard water and was 1.84 $L/m^2/h/bar$.

The embodiments described above are subject to various modifications within the scope of the invention which is defined by the following claims.

We claim:
1. A filtration process comprising the steps of:
permeating by
(a) flowing pressurized water to be filtered into the feed/retentate side of a module having at least one membrane adapted to selectively j reject hardness;
(b) collecting a softened permeate from a permeate side of the module;
(c) collecting a retentate from the module; and
(d) periodically stopping permeation and;
(i) injecting a fluid which is acidic or which forms an acid in water into the feed/retentate side of the module;
(ii) holding the fluid which is acidic or which forms an acid in water in the feed/retentate side of the module for a selected time; and
(iii) flushing the fluid which is acidic or which forms an acid in water from the feed/retentate side of the module as retentate after the expiration of the selected time.

2. The process of claim 1, where the fluid which is acidic or which forms an acid in water is injected into the feed/retentate side of the module for a period of time sufficient to displace the feed/retentate on the feed/retentate side of the module.

3. The process of claim 2 wherein the fluid is acidic and has a pH between 4.5 and 6.5.

4. The process as claimed in claim 3 wherein the selected time is between 20 and 30 minutes.

5. A filtration process comprising the steps of:

permeating by (a) flowing pressurized water to be filtered into the feed/retentate side of a module of having at least one membrane adapted to selectively reject hardness;

(b) collecting a softened permeate from a permeate side of the module;

(c) collecting a retentate from the module; and (d) periodically stopping permeation and;
  (i) injecting a gas which forms an acid in water into the feed/retentate side of the module for a period of time sufficient to substantially displace the feed/retentate on the feed/retentate side of the module with gas in a gaseous state;
  (ii) holding the gas which forms an acid in water in the feed/retentate side of the module for a selected time; and
  (iii) flushing the gas which is acidic or which forms an acid in water from the feed/retentate side of the module after the expiration of the selected time.

6. The process of claim 5 wherein the gas which forms an acid in water is carbon dioxide gas.

7. The process of claim 6 wherein the selected time is between 20 and 30 minutes.

8. The process of claim 6 wherein the carbon dioxide gas is held in the feed/retentate side of the module for the selected time at a pressure between 5 and 50 kPa.

9. The process of claim 6 wherein the at least one membrane has a plurality of pores and the carbon dioxide gas forms an acid in water in the pores of the at least one membranes with a pH between 4.5 and 6.5.

* * * * *